United States Patent
Kwon et al.

(10) Patent No.: US 11,450,921 B2
(45) Date of Patent: Sep. 20, 2022

(54) SEPARATOR FABRICATION METHOD, SEPARATOR FABRICATED THEREBY, AND ELECTROCHEMICAL ELEMENT COMPRISING SAME SEPARATOR

(71) Applicant: LG CHEM, LTD., Seoul (KR)

(72) Inventors: Hye-Jin Kwon, Daejeon (KR); Su-Jin Yoon, Daejeon (KR); Myeong-Soo Kim, Daejeon (KR); Je-An Lee, Daejeon (KR)

(73) Assignee: LG ENERGY SOLUTION, LTD., Seoul (KR)

( * ) Notice: Subject to any disclaimer, the term of this patent is extended or adjusted under 35 U.S.C. 154(b) by 180 days.

(21) Appl. No.: 16/483,342

(22) PCT Filed: Nov. 23, 2018

(86) PCT No.: PCT/KR2018/014565
§ 371 (c)(1),
(2) Date: Aug. 2, 2019

(87) PCT Pub. No.: WO2019/103545
PCT Pub. Date: May 31, 2019

(65) Prior Publication Data
US 2020/0014010 A1  Jan. 9, 2020

(30) Foreign Application Priority Data
Nov. 24, 2017  (KR) .................. 10-2017-0158508

(51) Int. Cl.
*H01M 50/403*  (2021.01)
*H01G 11/52*  (2013.01)
(Continued)

(52) U.S. Cl.
CPC .......... *H01M 50/403* (2021.01); *H01G 11/52* (2013.01); *H01G 11/74* (2013.01);
(Continued)

(58) Field of Classification Search
None
See application file for complete search history.

(56) References Cited

U.S. PATENT DOCUMENTS

2008/0292968 A1* 11/2008 Lee .................. H01M 10/0565
429/247
2012/0115038 A1   5/2012 Lee et al.
(Continued)

FOREIGN PATENT DOCUMENTS

CN  103477491 A  12/2013
EP  3 460 873 A1  3/2019
(Continued)

OTHER PUBLICATIONS

European Office Action dated Mar. 4, 2020 for corresponding EP Application No. 18881943.7.
(Continued)

*Primary Examiner* — Haroon S. Sheikh
*Assistant Examiner* — Patrick Marshall Greene
(74) *Attorney, Agent, or Firm* — Birch, Stewart, Kolasch & Birch, LLP (57) ABSTRACT

A method for manufacturing a separator, including the steps of: (S1) preparing a dispersion containing inorganic particles dispersed in a first solvent and a first binder polymer dissolved in the first solvent; (S2) preparing a binder polymer solution containing a second binder polymer dissolved in a second solvent, and mixing the binder polymer solution with the dispersion so that a combined weight of the inorganic particles and the first binder polymer in the dispersion may be 1.5-8 times of a weight of the second binder polymer in the binder polymer solution; and (S3) applying the resultant mixture to at least one surface of a porous polymer substrate, followed by drying, to form a porous coating layer on the porous polymer substrate. Also,
(Continued)

a separator obtained by the method and an electrochemical device including the same.

15 Claims, 3 Drawing Sheets

(51) Int. Cl.
    *H01G 11/74* (2013.01)
    *H01G 11/84* (2013.01)
    *H01M 10/0525* (2010.01)
    *H01M 50/446* (2021.01)
    *H01M 50/449* (2021.01)

(52) U.S. Cl.
    CPC ........ *H01G 11/84* (2013.01); *H01M 10/0525* (2013.01); *H01M 50/446* (2021.01); *H01M 50/449* (2021.01)

(56) References Cited

U.S. PATENT DOCUMENTS

| | | |
|---|---|---|
| 2014/0050965 A1 | 2/2014 | Ha et al. |
| 2015/0140404 A1* | 5/2015 | Yoo ..................... H01M 50/446 429/145 |
| 2015/0340676 A1 | 11/2015 | Schmidhauser et al. |
| 2016/0149184 A1* | 5/2016 | Nam ................... H01M 50/431 429/144 |
| 2016/0164060 A1 | 6/2016 | Zhang et al. |
| 2017/0331094 A1 | 11/2017 | Lee et al. |

FOREIGN PATENT DOCUMENTS

| | | |
|---|---|---|
| JP | 2015-522904 A | 8/2015 |
| KR | 10-2011-0097715 A | 8/2011 |
| KR | 10-2014-0037660 A | 3/2014 |
| KR | 10-2015-0001963 A | 1/2015 |
| KR | 10-2016-0048697 A | 5/2016 |
| KR | 10-2016-0065692 A | 6/2016 |
| KR | 10-2016-0115327 A | 10/2016 |
| KR | 10-2016-0118979 A | 10/2016 |
| KR | 10-2016-0129868 A | 11/2016 |
| KR | 10-2017-0044074 A | 4/2017 |

OTHER PUBLICATIONS

International Search Report for PCT/KR2018/014565 (PCT/ISA/210) dated Mar. 19, 2019, with English translation.

* cited by examiner

SEPARATOR FABRICATION METHOD, SEPARATOR FABRICATED THEREBY, AND ELECTROCHEMICAL ELEMENT COMPRISING SAME SEPARATOR

TECHNICAL FIELD

The present disclosure relates to a separator that may be used for an electrochemical device, such as a lithium secondary battery, a method for manufacturing the same, and an electrochemical device including the same.

The present application claims priority to Korean Patent Application No. 10-2017-0158508 filed on Nov. 24, 2017 in the Republic of Korea, the disclosures of which are incorporated herein by reference.

BACKGROUND ART

Recently, energy storage technology has been given an increasing attention. Efforts into research and development for electrochemical devices have been actualized more and more, as the application of energy storage technology has been extended to energy for cellular phones, camcorders and notebook PC and even to energy for electric vehicles. In this context, electrochemical devices have been most spotlighted. Among such electrochemical devices, development of rechargeable secondary batteries has been focused. More recently, active studies have been conducted about designing a novel electrode and battery in order to improve the capacity density and specific energy in developing such batteries.

Among the commercially available secondary batteries, lithium secondary batteries developed in the early 1990's have been spotlighted, since they have a higher driving voltage and significantly higher energy density as compared to conventional batteries, such as Ni-MH, Ni-Cd and sulfuric acid-lead batteries using an aqueous electrolyte.

Although such electrochemical devices have been produced from many production companies, safety characteristics thereof show different signs. Evaluation and securement of safety of such electrochemical devices are very important. The most important consideration is that electrochemical devices should not damage users upon their malfunction. For this purpose, safety standards strictly control ignition and smoke emission in electrochemical devices. With regard to safety characteristics of electrochemical devices, there is a great concern about explosion when an electrochemical device is overheated to cause thermal runaway or perforation of a separator. Particularly, a polyolefin-based porous polymer substrate used conventionally as a separator for an electrochemical device shows a severe heat shrinking behavior at a temperature of 100° C. or higher due to its material property and a characteristic during its manufacturing process, including orientation, thereby causing a short-circuit between a cathode and an anode.

To solve the above-mentioned safety problems of an electrochemical device, there has been suggested a separator having a porous organic-inorganic coating layer formed by applying a mixture of an excessive amount of inorganic particles and a binder polymer onto at least one surface of a porous polymer substrate having a plurality of pores.

Meanwhile, the commercially available porous coating layer is formed by mixing a binder polymer with inorganic particles at once to form slurry for forming a porous coating layer, and applying the slurry onto a porous polymer substrate. However, such a method has a problem in that the inorganic particles in the slurry for forming a porous coating layer are not dispersed effectively.

Therefore, there is a need for a method for dispersing the inorganic particles in the slurry for forming a porous coating layer more stably.

DISCLOSURE

Technical Problem

The present disclosure is designed to solve the problems of the related art, and therefore the present disclosure is directed to providing a method for manufacturing a separator by which inorganic particles in slurry for forming a porous coating layer can be dispersed homogeneously.

The present disclosure is also directed to providing a separator which has excellent adhesion and high packing density.

Further, the present disclosure is directed to providing an electrochemical device including the separator.

Technical Solution

In one aspect of the present disclosure, there is provided the method for manufacturing a separator according to any one of the following embodiments.

According to the first embodiment of the present disclosure, there is provided a method for manufacturing a separator, including the steps of:

(S1) preparing a dispersion containing inorganic particles (A) dispersed in a first solvent and a first binder polymer (B) dissolved in the first solvent;

(S2) preparing a binder polymer solution containing a second binder polymer (C) dissolved in a second solvent, and mixing the binder polymer solution with the dispersion wherein a ratio (A+B)/C, which is the ratio of a combined weight of the inorganic particles (A) and the first binder polymer (B) in the dispersion to a weight of the second binder polymer (C) in the binder polymer solution may be 1.5-8, thereby providing slurry for forming a porous coating layer; and (S3) applying the slurry for forming a porous coating layer to at least one surface of a porous polymer substrate, followed by drying, to form a porous coating layer on the porous polymer substrate.

According to the second embodiment of the present disclosure, there is provided the method for manufacturing a separator as defined in the first embodiment, wherein the ratio of (A+B)/C.

According to the third embodiment of the present disclosure, there is provided the method for manufacturing a separator as defined in the first or the second embodiment, wherein each of the first binder polymer (B) and the second binder polymer (C) is any one independently selected from the group consisting of polyvinylidene fluoride-co-hexafluoropropylene, polyvinylidene fluoride-co-trichloroethylene, polymethyl methacrylate, polyethylhexyl acrylate, polybutyl acrylate, polyacrylonitrile, polyvinyl pyrrolidone, polyvinyl acetate, polyethylene-co-vinyl acetate, polyethylene oxide, polyarylate, cellulose acetate, cellulose acetate butyrate, cellulose acetate propionate, cyanoethyl pullulan, cyanoethylpolyvinyl alcohol, cyanoethyl cellulose, cyanoethyl sucrose, pullulan, carboxymethyl cellulose and combinations thereof.

According to the fourth embodiment of the present disclosure, there is provided the method for manufacturing a separator as defined in any one of the first to the third embodiments, wherein the first binder polymer includes a cyano resin containing a cyano (CN) group.

According to the fifth embodiment of the present disclosure, there is provided the method for manufacturing a separator as defined in the fourth embodiment, wherein the first binder polymer includes a cyano resin further containing a hydroxyl (OH) group.

According to the sixth embodiment of the present disclosure, there is provided the method for manufacturing a separator as defined in any one of the first to the fifth embodiments, wherein the first binder polymer includes any one selected from the group consisting of acrylonitrile, cyanoethyl pullulan, cyanoethylpolyvinyl alcohol, cyanoethyl cellulose, cyanoethyl sucrose and combinations thereof.

According to the seventh embodiment of the present disclosure, there is provided the method for manufacturing a separator as defined in any one of the first to the sixth embodiments, wherein the combined weight of the inorganic particles and the first binder polymer is 20-40 parts by weight based on 100 parts by weight of the dispersion.

According to the eighth embodiment of the present disclosure, there is provided the method for manufacturing a separator as defined in any one of the first to the seventh embodiments, wherein a total content of the second binder polymer is 5-13 parts by weight based on 100 parts by weight of the binder polymer solution.

According to the ninth embodiment of the present disclosure, there is provided the method for manufacturing a separator as defined in any one of the first to the eighth embodiments, wherein the inorganic particles include any one selected from the group consisting of $BaTiO_3$, $Pb(Zr_xTi_{1-x})O_3$ (PZT, $0<x<1$), $Pb_{1-x}La_xZr_{1-y}Ti_yO_3$ (PLZT, $0<x<1$, $0<y<1$), $(1-x)Pb(Mg_{1/3}Nb_{2/3})O_3-xPbTiO_3$ (PMN-PT, $0<x<1$), hafnia ($HfO_2$), $SrTiO_3$, $SnO_2$, $CeO_2$, MgO, NiO, CaO, ZnO, $ZrO_2$, $Y_2O_3$, $Al_2O_3$, $SiO_2$, AlOOH, $TiO_2$, SiC and combinations thereof.

According to the tenth embodiment of the present disclosure, there is provided the method for manufacturing a separator as defined in any one of the first to the ninth embodiments, wherein each of the first solvent and the second solvent includes any one independently selected from the group consisting of acetone, tetrahydrofuran, methylene chloride, chloroform, dimethylformamide, N-methyl-2-pyrrolidone (NMP), cyclohexane, water and combinations thereof.

According to the eleventh embodiment of the present disclosure, there is provided the method for manufacturing a separator as defined in any one of the first to the tenth embodiments, wherein the weight ratio of the inorganic particles: combined weight of the first binder polymer and the second binder polymer is 50:50-99:1.

According to the twelfth embodiment of the present disclosure, there is provided the method for manufacturing a separator as defined in any one of the first to the eleventh embodiments, wherein the weight ratio of the first binder polymer content in the dispersion: the second binder polymer content in the binder polymer solution is 1:5-1:26.

In another aspect of the present disclosure, there is provided the separator according to the following embodiment.

According to the thirteenth embodiment of the present disclosure, there is provided a separator obtained by the method as defined in any one of the first to the twelfth embodiments.

In still another aspect of the present disclosure, there is provided the electrochemical device as defined in any one of the following embodiments.

According to the fourteenth embodiment of the present disclosure, there is provided an electrochemical device including a cathode, an anode and a separator interposed between the cathode and the anode, wherein the separator is the separator as defined in the thirteenth embodiment.

According to the fifteenth embodiment of the present disclosure, there is provided the electrochemical device as defined in the fourteenth embodiment, which is a lithium secondary battery.

Advantageous Effects

According to the present disclosure, it is possible to provide a method for manufacturing a separator having improved dispersibility of inorganic particles by forming a dispersion containing a small amount of the first binder polymer dissolved in a solvent.

According to the present disclosure, it is possible to provide a method for manufacturing a separator having improved dispersibility of inorganic particles by controlling the weight ratio of the dispersion to the binder polymer solution.

According to the present disclosure, it is possible to provide a separator obtained by the above-mentioned method and having excellent adhesion and high packing density, and an electrochemical device including the separator.

BEST MODE

Hereinafter, preferred embodiments of the present disclosure will be described in detail with reference to the accompanying drawings. Prior to the description, it should be understood that the terms used in the specification and the appended claims should not be construed as limited to general and dictionary meanings, but interpreted based on the meanings and concepts corresponding to technical aspects of the present disclosure on the basis of the principle that the inventor is allowed to define terms appropriately for the best explanation.

As used herein, the expression 'one portion is connected to another portion' covers not only 'a portion is directly connected to another portion' but also 'one portion is connected indirectly to another portion' by way of the other element interposed between them. In addition, 'connection' covers electrochemical connection as well as physical connection.

Throughout the specification, the expression 'a part of includes an element' does not preclude the presence of any additional elements but means that the part may further include the other elements.

In addition, it will be understood that the terms "comprises" and/or "comprising", or "includes" and/or "including" when used in this specification, refer to the presence of any stated shapes, numbers, steps, operations, members, elements and/or groups thereof, but do not preclude the addition of one or more other shapes, numbers, steps, operations, members, elements and/or groups thereof.

As used herein, the terms 'approximately', 'substantially', or the like, are used as meaning contiguous from or to the stated numerical value, when an acceptable preparation and material error unique to the stated meaning is suggested, and are used for the purpose of preventing an unconscientious invader from unduly using the stated disclosure including an accurate or absolute numerical value provided to help understanding of the present disclosure.

As used herein, the term 'combination thereof' included in any Markush-type expression means a combination or mixture of one or more elements selected from the group of elements disclosed in the Markush-type expression, and refers to the presence of one or more elements selected from the group.

As used herein, the expression 'A and/or B' means 'A, B or both of them'.

The commercially available porous coating layer is formed by mixing inorganic particles with a binder polymer at once and applying the resultant slurry for forming a porous coating layer. However, in this case, there is a problem in that the inorganic particles are aggregated due to high viscosity in the slurry.

To solve the above-mentioned problem, the present inventors have developed a method for manufacturing a separator including inorganic particles dispersed homogeneously therein by dispersing the inorganic particles preliminarily in a solution containing a first binder polymer dissolved therein, and mixing the dispersion with a binder polymer solution containing a second binder polymer dissolved therein at an adequate ratio.

In one aspect of the present disclosure, there is provided a method for manufacturing a separator, including the steps of:

(S1) preparing a dispersion containing inorganic particles (A) dispersed in a first solvent and a first binder polymer (B) dissolved therein;

(S2) preparing a binder polymer solution containing a second binder polymer (C) dissolved in a second solvent, and mixing the binder polymer solution with the dispersion so that the ratio ((A+B)/C) of the combined weight of the inorganic particles (A) and the first binder polymer (B) in the dispersion to the weight of the second binder polymer (C) in the binder polymer solution may be 1.5-8, thereby providing slurry for forming a porous coating layer; and (S3) applying the slurry for forming a porous coating layer to at least one surface of the porous polymer substrate, followed by drying, to form a porous coating layer.

Figure 1:
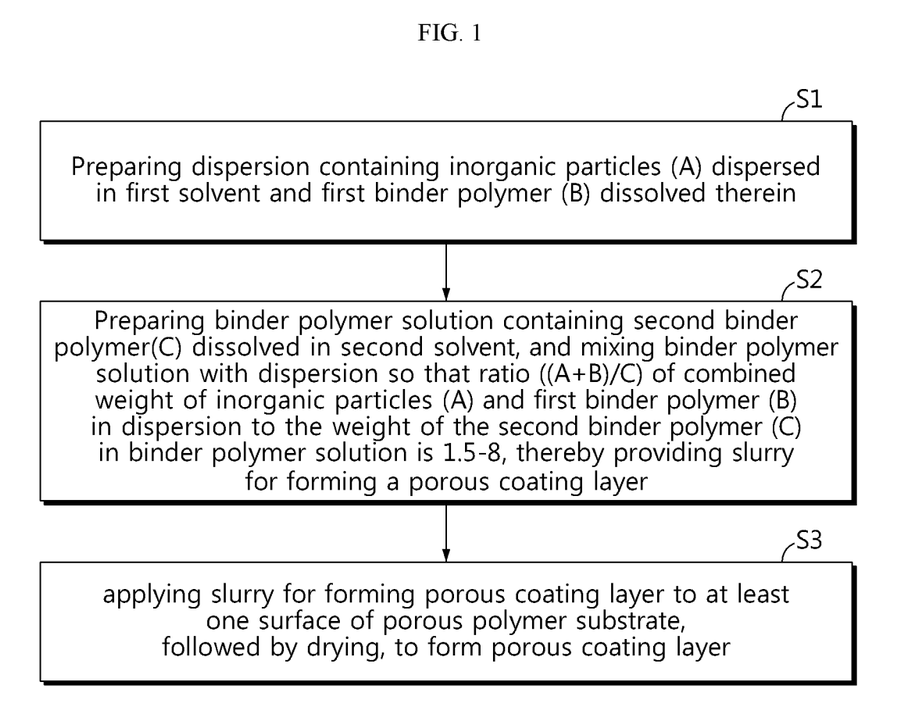
FIG. 1 is a flow chart illustrating the method for manufacturing a separator according to an embodiment of the present disclosure.

FIG. 1 is a flow chart illustrating the method for manufacturing a separator according to an embodiment of the present disclosure.

Hereinafter, the present disclosure will be explained in detail with reference to FIG. 1.

In step (S1), a dispersion containing inorganic particles dispersed in the first solvent and the first binder polymer dissolved in the first solvent is prepared.

When the inorganic particles are dispersed in the first solvent and a small amount of the first binder polymer is dissolved in the first solvent, the inorganic particles may be dispersed homogeneously as compared to dissolution of the whole binder polymer required for forming a porous coating layer at once in a solvent. This is because the first binder polymer is present in a small amount in the dispersion to prevent aggregation of the inorganic particles or the first binder polymer. Thus, the resultant dispersion has a decreased particle size and improved phase stability.

In the method for manufacturing a separator according to an embodiment of the present disclosure, the first binder polymer used for the dispersion is a polymer used currently for forming a porous coating layer in the art, as long as it can disperse inorganic particles. Particularly, a polymer having a glass transition temperature ($T_g$ of −200 to 200° C. may be used. This is because such a polymer can improve the mechanical properties, such as flexibility and elasticity, of the finally formed porous coating layer. Such a binder polymer functions as a binder which connects and stably fixes the inorganic particles with each other, and thus contributes to prevention of degradation of mechanical properties of a separator having a porous coating layer. In addition, the first binder polymer according to the present disclosure allows the inorganic particles to be dispersed more homogeneously in the dispersion.

In addition, it is not essentially required for the first binder polymer to have ion conductivity. However, when using a polymer having ion conductivity, it is possible to further improve the performance of an electrochemical device. Therefore, a binder polymer having a dielectric constant as high as possible may be used as the first binder polymer. In fact, since the dissociation degree of a salt in an electrolyte depends on the dielectric constant of the solvent for the electrolyte, use of a binder polymer having a higher dielectric constant as the first binder polymer can improve the salt dissociation degree in an electrolyte. The first binder polymer may have a dielectric constant ranging from 1.0 to 100 (measured at a frequency of 1 kHz), particularly 10 or more.

In addition to the above-mentioned function, the first binder polymer may be characterized in that it is gelled upon the impregnation with a liquid electrolyte and thus shows a high degree of swelling. Thus, the first binder polymer has a solubility parameter (i.e., Hildebrand solubility parameter) of 15-45 $MPa^{1/2}$ or 15-25 $MPa^{1/2}$ and 30-45 $MPa^{1/2}$. Therefore, hydrophilic polymers having many polar groups may be used more frequently as compared to hydrophobic polymers, such as polyolefins. When the solubility parameter is less than 15 $MPa^{1/2}$ and more than 45 $MPa^{1/2}$ it is difficult for the binder polymer to be swelled with a conventional liquid electrolyte for a battery.

Non-limiting examples of the first binder polymer include but are not limited to: polyvinylidene fluoride-co-hexafluoropropylene, polyvinylidene fluoride-co-trichloro ethylene, polymethyl methacrylate, polyethylhexyl acrylate, polybutyl acrylate, polyacrylonitrile, polyvinyl pyrrolidone, polyvinyl acetate, polyethylene-co-vinyl acetate, polyethylene oxide, polyarylate, cellulose acetate, cellulose acetate butyrate, cellulose acetate propionate, cyanoethylpullulan, cyanoethylpolyvinyl alcohol, cyanoethyl cellulose, cyanoethyl sucrose, pullulan and carboxymethyl cellulose.

Particularly, in the method for manufacturing a separator according to the present disclosure, the first binder polymer may be a cyano resin having a cyano (CN) group. The first binder polymer may be a cyano resin containing both a CN group and a hydroxyl (OH) group.

CN group is hydrophobic, and thus can prevent aggregation of inorganic particles. Meanwhile, CN group is hydrophobic but OH group is hydrophilic. Therefore, such hydrophilic OH groups surround the surface of hydrophilic inorganic particles so that the inorganic particles may be dispersed more homogeneously in the dispersion.

For example, the cyano resin may include any one selected from the group consisting of acrylonitrile, cyanoethylpullulan, cyanoethylpolyvinyl alcohol, cyanoethyl cellulose, cyanoethyl sucrose and combinations thereof.

Figure 2A:
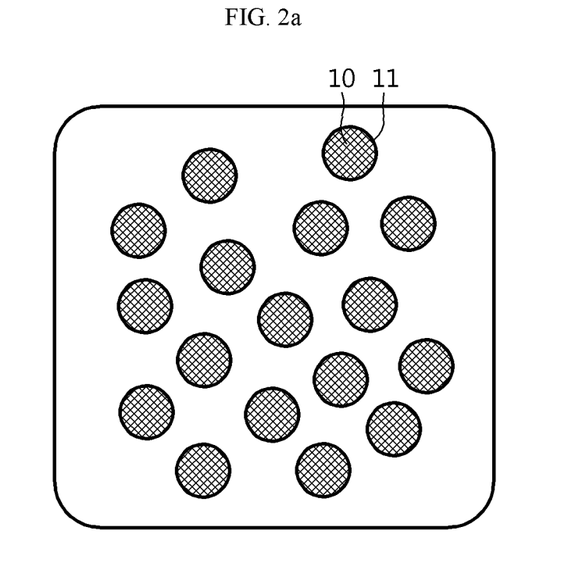
FIG. 2a is a schematic view illustrating the dispersion according to an embodiment of the present disclosure.

FIG. 2a is a schematic view illustrating the dispersion according to an embodiment of the present disclosure. In FIG. 2a, the circle represents inorganic particles 10, and the black border line represents the first binder polymer 11. In addition, the first binder polymer is dissolved in the solvent (such a dissolved state is not shown).

The content of the first binder polymer in the dispersion may be 0.1-3 wt %. When the content of the first binder polymer is less than 0.1 wt %, the weight of the first binder polymer is relatively smaller than that of the inorganic particles so that the inorganic particles may not be surrounded with the first polymer binder sufficiently to cause aggregation of the inorganic particles or degradation of dispersion efficiency. When the content of the first binder polymer is larger than 3 wt %, the amount of the first binder polymer is excessively large and the remaining first binder polymer may be aggregated again after the dispersion of the inorganic particles to cause degradation of the performance of an electrochemical device.

There is no particular limitation in the inorganic particles, as long as they are electrochemically stable. In other words, there is no particular limitation in the inorganic particles that may be used herein, as long as they cause no oxidation and/or reduction in the range (e.g. 0-5 V based on Li/Li+) of operating voltage of an applicable electrochemical device. Particularly, when using inorganic particles having a high dielectric constant as the inorganic particles, it is possible to improve the ion conductivity of an electrolyte by increasing the dissociation degree of an electrolyte salt, such as a lithium salt, in a liquid electrolyte.

For the above-mentioned reasons, the inorganic particles may be inorganic particles having a dielectric constant of 5 or more, inorganic particles having lithium ion transportability or a combination thereof.

The inorganic particles having a dielectric constant of 5 or more may include any one selected from the group consisting of $Al_2O_3$, $SiO_2$, $ZrO_2$, AlOOH, $TiO_2$, $BaTiO_3$, $Pb(Zr,Ti)O_3$ (PZT, wherein 0<x<1), $Pb_{1-x}La_xZr_{1-y}Ti_yO_3$ (PLZT, wherein 0<x<1, 0<y<1), $(1-x)Pb(Mg_{1/2}Nb_{2/3})O_{3-x}PbTiO_3$ (PMN-PT, wherein 0<x<1), hafnia ($HfO_2$), $SrTiO_3$, $SnO_2$, $CeO_2$, MgO, NiO, CaO, ZnO, SiC and combinations thereof.

The inorganic particles having lithium ion transportability may be any one selected from the group consisting of include lithium phosphate ($Li_3PO_4$), lithium titanium phosphate ($Li_xTi_y(PO_4)_3$, 0<x<2, <y<3), lithium aluminum titanium phosphate ($Li_xAl_yTi_z(PO_4)_3$, 0<x<2, 0<y<1, 0<z<3), $(LiAlTiP)_xO_y$— based glass (0<x<4, 0<y<13), such as $14Li_2O$—$9Al_2O_3$—$38TiO_2$—$39P_2O_5$, lithium lanthanum titanate ($Li_xLa_yTiO_3$, 0<x<2, 0<y<3), lithium germanium thiophosphate ($Li_xGe_yP_zS_w$, 0<x<4, 0<y<1, 0<z<1, 0<w<5), lithium nitride ($Li_xN_y$, 0<x<4, 0<y<2), $SiS_2$-based glass ($Li_xSi_yS_z$, 0<x<3, 0<y<2, 0<z<4), $P_2S_5$-based glass ($Li_xP_yS_z$, 0<x<3, 0<y<3, 0<z<7), and combinations thereof.

In addition, there is no particular limitation in the average particle diameter of the inorganic particles. However, the inorganic particles preferably have an average particle diameter of 0.001-10 μm in order to form a porous coating layer with a uniform thickness and to provide suitable porosity. When the average particle diameter is less than 0.001 μm, dispersibility may be degraded. When the average particle diameter is larger than 10 μm, the resultant porous coating layer may have an increased thickness.

According to the present disclosure, the combined weight of the inorganic particles and the first binder polymer may be 20-40 parts by weight based on 100 parts by weight of the dispersion. Within the above-defined range, it is possible to improve the dispersibility of the inorganic particles in the dispersion.

According to an embodiment of the present disclosure, the weight ratio of the weight of the inorganic particles to the combined weight of the first binder polymer and the second binder polymer is 50:50-99:1, particularly 70:30-97.5:2.5. When the weight ratio of the weight of the inorganic particles to the combined weight of the first binder polymer and the second binder polymer satisfies the above-defined range, the total content of the first binder polymer and the second binder polymer is increased to prevent a decrease in pore size and porosity of the resultant coating layer and to solve the problem of degradation of peeling resistance of the resultant coating layer caused by a decreased content of the first binder polymer and the second binder polymer.

The first solvent may be a solvent having a low boiling point to facilitate removal of the solvent after manufacturing a separator. Particular examples of the first solvent include any one selected from acetone, tetrahydrofuran, methylene chloride, chloroform, dimethyl formamide, N-methyl-2-pyrrolidone, cyclohexane, water and combinations thereof.

When forming the dispersion by dispersing the inorganic particles in the first solvent and dissolving the first binder polymer in the first solvent, a milling process may be used to carry out dispersion so that the dispersion efficiency of the inorganic particles may be improved. However, the dispersion method used for dispersing the inorganic particles is not limited thereto.

Meanwhile, when two or more types of inorganic particles are used, they are mixed first, and then dispersed in the first solvent containing the first binder polymer dissolved therein. This facilitates reduction of the particle size of slurry particles in the slurry for forming a porous coating layer as described hereinafter.

Then, in step (S2), a binder polymer solution containing the second binder polymer dissolved in the second solvent is prepared, and then mixed with the dispersion prepared from step (S1) to provide slurry for forming a porous coating layer.

When the total content of the binder polymers (the first binder polymer and the second binder polymer) in the slurry for forming a porous coating layer is excessively low, inorganic particles may be separated with ease from the porous coating layer. On the contrary, according to the present disclosure, the binder polymer solution is introduced additionally to the dispersion so that the binder polymers (the first binder polymer and the second binder polymer) fix and connect the inorganic particles. Thus, it is possible to form a porous coating layer having excellent adhesion. In addition, in the method for manufacturing a separator according to the present disclosure, the dispersion is mixed with the binder polymer solution within the range defined hereinafter so that the inorganic particles may be dispersed more homogeneously in the slurry for forming a porous coating layer.

According to an embodiment of the present disclosure, in step (S2), the combined weight of the inorganic particles and the first binder polymer in the dispersion is 1.5-8 times of the weight of the second binder polymer in the binder polymer solution. When the binder polymer solution is mixed with the dispersion within the above-defined range, slurry particles in the slurry for forming a porous coating layer cause sedimentation at an adequate rate to provide slurry for forming a porous coating layer including slurry particles dispersed homogeneously therein. Thus, it is possible to obtain a separator with high quality.

According to an embodiment of the present disclosure, the ratio of the combined weight (A+B) of the inorganic particles (A) and the first binder polymer (B) in the dispersion to the weight of the second binder polymer (C) in the binder polymer solution may be 2.3-4.3. Within the above-defined range, it is possible to obtain slurry for forming a porous coating layer having a small particle size and high sedimentation rate, and thus to provide a separator having high packing density and improved adhesion.

The slurry particles in the slurry for forming a porous coating layer may be interconnected by the second binder polymer, wherein the slurry particles mean particles including the inorganic particles and the first binder polymer surrounding the same, prepared in step (S1).

The slurry particles may have a particle size of 1-2.4 µm. According to an embodiment of the present disclosure, the lower limit of the particle size may be 1 µm or more, 1.5 µm or more, or 1.8 µm or more, and the upper limit of the particle size may be 2.4 µm or less, 2.2 µm or less, or 2.1 µm or less. According to another embodiment of the present disclosure, the particle size range may be a combination of the upper limit with the lower limit.

Within the above-defined range, the inorganic particles may be dispersed homogeneously in the slurry for forming a porous coating layer and may have an adequate particle size and high phase stability.

Figure 2B:
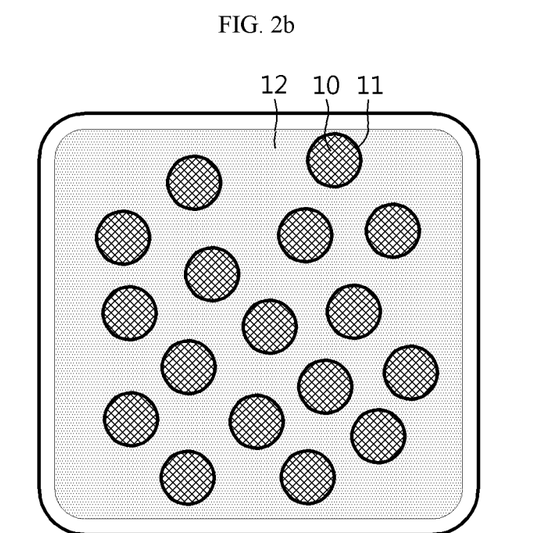
FIG. 2b is a schematic view illustrating the slurry for forming a porous coating layer according to an embodiment of the present disclosure.
Figure 2C:
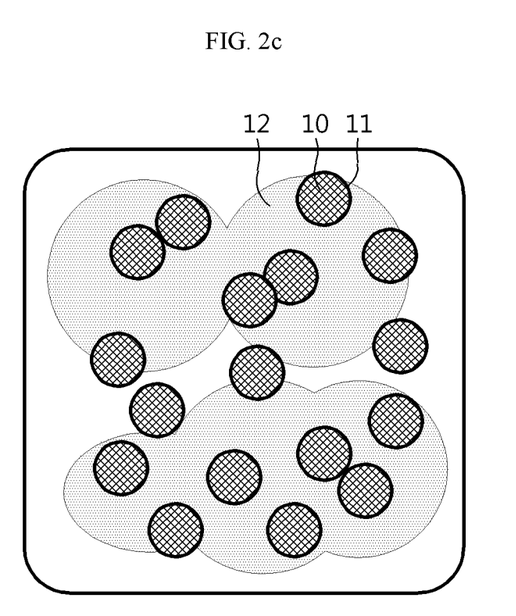
FIG. 2c is a schematic view illustrating the slurry for forming a porous coating layer according to Comparative Example.

FIG. 2b is a schematic view illustrating the slurry for forming a porous coating layer according to an embodiment of the present disclosure, and FIG. 2c is a schematic view illustrating the slurry for forming a porous coating layer according to Comparative Examples 1-3. The slashed region in each of FIG. 2b and FIG. 2c represents the binder polymer solution 12 containing the second binder polymer dissolved in the second solvent.

As shown in FIG. 2b, when the weight ratio of the combined weight of the inorganic particles and the first binder polymer in the dispersion to the weight of the second binder polymer in the binder polymer solution is within the above-defined range, the inorganic particles may be dispersed homogeneously in the slurry and has an adequate particle size and high phase stability.

On the contrary, as shown in FIG. 2c, when the weight ratio is not within the above-defined range, aggregation of the inorganic particles occurs and the inorganic particles have a large particle size and significantly low phase stability.

In the separator according to an embodiment of the present disclosure, the second binder polymer used for forming a porous coating layer is a polymer used currently for forming a porous coating layer in the art. In the separator according to an embodiment of the present disclosure, the second binder polymer may be the same as or different from the first binder polymer.

Particularly, a polymer having a glass transition temperature ($T_g$) of −200 to 200° C. may be used. This is because such a polymer can improve the mechanical properties, such as flexibility and elasticity, of the finally formed porous coating layer. The second binder polymer functions as a binder which connects and stably fixes the inorganic particles with each other, and thus contributes to prevention of degradation of mechanical properties of a separator having a porous coating layer.

In addition, it is not essentially required for the second binder polymer to have ion conductivity. However, when using a polymer having ion conductivity, it is possible to further improve the performance of an electrochemical device. Therefore, a binder polymer having a dielectric constant as high as possible may be used as the second binder polymer. In fact, since the dissociation degree of a salt in an electrolyte depends on the dielectric constant of the solvent for the electrolyte, use of a binder polymer having a higher dielectric constant as the second binder polymer can improve the salt dissociation degree in an electrolyte. The second binder polymer may have a dielectric constant ranging from 1.0 to 100 (measured at a frequency of 1 kHz), particularly 10 or more.

In addition to the above-mentioned function, the second binder polymer may be characterized in that it is gelled upon the impregnation with a liquid electrolyte and thus shows a high degree of swelling. Thus, the second binder polymer has a solubility parameter (i.e., Hildebrand solubility parameter) of 15-45 $MPa^{1/2}$ or 15-25 $MPa^{1/2}$ and 30-45 $MPa^{1/2}$. Therefore, hydrophilic polymers having many polar groups may be used more frequently as compared to hydrophobic polymers, such as polyolefins. When the solubility parameter is less than 15 $MPa^{1/2}$ and more than 45 $MPa^{1/2}$, it is difficult for the binder polymer to be swelled with a conventional liquid electrolyte for a battery.

Non-limiting examples of the second binder polymer include but are not limited to: polyvinylidene fluoride-co-hexafluoropropylene, polyvinylidene fluoride-co-trichloro ethylene, polymethyl methacrylate, polyethylhexyl acrylate, polybutyl acrylate, polyacrylonitrile, polyvinyl pyrrolidone, polyvinyl acetate, polyethylene-co-vinyl acetate, polyethylene oxide, polyarylate, cellulose acetate, cellulose acetate butyrate, cellulose acetate propionate, cyanoethylpullulan, cyanoethylpolyvinyl alcohol, cyanoethyl cellulose, cyanoethyl sucrose, pullulan and carboxymethyl cellulose.

According to an embodiment of the present disclosure, the total content of the second binder polymer may be 4.8-13.9, or 5-13 parts by weight based on 100 parts by weight of the binder polymer solution. Within the above-defined range, it is possible to provide a separator having improved dispersibility and excellent adhesion.

According to an embodiment of the present disclosure, the weight ratio of the first binder polymer in the dispersion to the second binder polymer in the binder polymer solution may be 1:4.8-1:27, or 1:5-1:26. Within the above-defined range, it is possible to provide a separator having improved dispersibility and excellent adhesion.

The slurry particles may have a sedimentation rate larger than 0 µm/s and equal to or less than 0.4 µm/s. According to an embodiment of the present disclosure, the slurry particles may have a sedimentation rate of 0.3 µm/s or less, 0.27 µm/s or less, or 0.23 µm/s or less. Within the above-defined range, the slurry particles have an adequately low sedimentation rate so that they may be dispersed homogeneously in the slurry, thereby providing improved phase stability.

According to an embodiment of the present disclosure, description about the first solvent may also be applied to description about the second solvent.

According to an embodiment of the present disclosure, the first solvent and the second solvent may be the same or different.

According to an embodiment of the present disclosure, it is preferred that the first solvent and the second solvent are the same, since the solvents may be mixed well and cause little aggregation.

Then, the slurry for forming a porous coating layer is applied to at least one surface of the porous polymer substrate, followed by drying, to provide a separator having a porous coating layer formed thereon (S3).

Particularly, the porous polymer substrate may be a porous polymer film substrate or a porous polymer nonwoven substrate.

The porous polymer film substrate may be a porous polymer film including polyolefin, such as polyethylene or polypropylene. Such a polyolefin porous polymer film substrate may realize a shut-down function at a temperature of 80-130° C.

Herein, the polyolefin porous polymer film may be formed of polymers including polyolefin polymers, such as polyethylene, including high-density polyethylene, linear low-density polyethylene, low-density polyethylene or ultrahigh-molecular weight polyethylene, polypropylene, polybutylene, or polypentene, alone or in combination.

In addition, the porous polymer film substrate may be obtained by molding various polymers, such as polyesters, other than polyolefins, into a film shape. Further, the porous polymer film substrate may have a stacked structure of two or more film layers, wherein each film layer may be formed of polymers including the above-mentioned polymers, such as polyolefins or polyesters, alone or in combination.

In addition, the porous polymer film substrate and porous nonwoven web substrate may be formed of polyethylene terephthalate, polybutylene terephthalate, polyester, polyacetal, polyamide, polycarbonate, polyimide, polyetherether ketone, polyether sulfone, polyphenylene oxide, polyphenylene sulfide, or polyethylene naphthalene, alone or in combination, besides the above-mentioned polyolefins.

Although there is no particular limitation in the thickness of the porous polymer substrate, the porous polymer substrate may have a thickness of 1-100 µm particularly 5-50 µm. Although there is no particular limitation in the size of the pores present in the porous substrate and porosity, the pore size and porosity may be 0.01-50 µm and 0.1-95%, respectively.

Although there is no particular limitation in the process for coating the composition for forming a porous coating layer onto the porous polymer substrate, a slot coating, dip coating, spray, ink jet printing, screen printing or a dispending process may be used. According to an embodiment of the present disclosure, the porous coating layer is formed preferably by using a slot coating or dip coating process. A slot coating process includes coating a composition supplied through a slot die onto the whole surface of a substrate and is capable of controlling the thickness of a coating layer depending on the flux supplied from a metering pump. In addition, dip coating includes dipping a substrate into a tank containing a composition to carry out coating and is capable of controlling the thickness of a coating layer depending on the concentration of the composition and the rate of removing the substrate from the composition tank. Further, in order to control the coating thickness more precisely, it is possible to carry out post-metering through a Mayer bar or the like, after dipping.

Then, the porous polymer substrate coated with the composition for forming a porous coating layer is dried by using a dryer, such as an oven, thereby forming porous coating layers on at least one surface of the porous polymer substrate.

In the porous coating layers, the inorganic particles are bound among themselves by the binder polymer (the first binder polymer and the second binder polymer), while they are packed and are in contact with each other. Thus, interstitial volumes are formed among the inorganic particles and the interstitial volumes become vacant spaces to form pores.

In other words, the binder polymer (the first binder polymer and the second binder polymer) attaches the inorganic particles to each other so that they may retain their binding states. For example, the binder polymer (the first binder polymer and the second binder polymer) connects and fixes the inorganic particles with each other. In addition, the pores of the porous coating layer are those formed by the interstitial volumes among the inorganic particles which become vacant spaces. The space may be defined by the inorganic particles facing each other substantially in a closely packed or densely packed structure of the inorganic particles.

In another aspect of the present disclosure, there is provided a separator obtained by the above-described method.

The separator includes a porous polymer substrate and a porous coating layer formed on the porous polymer substrate, wherein the porous coating layer may include core-shell structured slurry particles which include a core portion including inorganic particles and a shell including the first binder polymer surrounding the core.

The separator according to the present disclosure has excellent phase stability by virtue of a small particle size of the slurry particles contained in the porous coating layer of 1-2.4 µm, preferably 1.8-2.1 µm. In addition, the separator has high packing density of the slurry particles in the porous coating layer and excellent adhesion.

The electrochemical device according to still another embodiment of the present disclosure includes a cathode, an anode and a separator interposed between the cathode and the anode, wherein the separator is the above-described separator according to an embodiment of the present disclosure.

The electrochemical device includes any device which carries out electrochemical reaction, and particular examples thereof include all types of primary batteries, secondary batteries, fuel cells, solar cells or capacitors, such as super capacitor devices. Particularly, among the secondary batteries, lithium secondary batteries, including lithium metal secondary batteries, lithium ion secondary batteries, lithium polymer secondary batteries or lithium ion polymer batteries, are preferred.

The two electrodes, cathode and anode, used in combination with the separator according to the present disclosure are not particularly limited, and may be obtained by allowing electrode active materials to be bound to an electrode current collector through a method generally known in the art. Among the electrode active materials, non-limiting examples of a cathode active material include conventional cathode active materials that may be used for the cathodes for conventional electrochemical devices. Particularly, lithium manganese oxides, lithium cobalt oxides, lithium nickel oxides, lithium iron oxides or lithium composite oxides containing a combination thereof are used preferably. Non-limiting examples of an anode active material include conventional anode active materials that may be used for the anodes for conventional electrochemical devices. Particularly, lithium-intercalating materials, such as lithium metal or lithium alloys, carbon, petroleum coke, activated carbon, graphite or other carbonaceous materials, are used preferably. Non-limiting examples of a cathode current collector include foil made of aluminum, nickel or a combination thereof. Non-limiting examples of an anode current collector include foil made of copper, gold, nickel, nickel alloys or a combination thereof.

The electrolyte that may be used in the electrochemical device according to the present disclosure is a salt having a structure of $A^+B^-$, wherein $A^+$ includes an alkali metal cation such as $Li^+$, $Na^+$, $K^+$ or a combination thereof, and $B^-$ includes an anion such as $PF_6^-$, $BF_4^-$, $Cl^-$, $Br^-$, $I^-$, $ClO_4^-$, $AsF_6^-$, $CH_3CO_2^-$, $CF_3SO_3^-$, $N(CF_3SO_2)_2^-$, $C(CF_2SO_2)_3^-$ or a combination thereof, the salt being dissolved or dissociated in an organic solvent including propylene carbonate (PC), ethylene carbonate (EC), diethyl carbonate (DEC), dimethyl carbonate (DMC), dipropyl carbonate (DPC), dimethyl sulfoxide, acetonitrile, dimethoxyethane, diethoxyethane, tetrahydrofuran, N-methyl-2-pyrrolidone (NMP), ethyl methyl carbonate (EMC), gamma-butyrolactone (γ-butyrolactone) or a combination thereof. However, the present disclosure is not limited thereto.

Injection of the electrolyte may be carried out in an adequate step during the process for manufacturing a battery depending on the manufacturing process of a final product and properties required for a final product. In other words, injection of the electrolyte may be carried out before the assemblage of a battery or in the final step of the assemblage of a battery.

MODE FOR DISCLOSURE

Examples will be described more fully hereinafter so that the present disclosure can be understood with ease. The following examples may, however, be embodied in many different forms and should not be construed as limited to the exemplary embodiments set forth therein. Rather, these exemplary embodiments are provided so that the present disclosure will be thorough and complete, and will fully convey the scope of the present disclosure to those skilled in the art.

Example 1

1) Manufacture of Anode

An anode active material (artificial graphite), a conductive material (carbon black), carboxymethyl cellulose (CMC) and a binder (polyvinylidene fluoride, PVDF) were mixed with water at a weight ratio of 95.8:1:1.2:2 to provide anode slurry. The anode slurry was coated onto copper (Cu) foil to a thickness of 50 μm to form an electrode plate. Then, the electrode plate was dried at 135° C. for 3 hours or more and subjected to pressing to provide an anode.

2) Manufacture of Cathode

A cathode active material (LiCoO$_2$), a conductive material (carbon black), and a binder (polyvinylidene fluoride, PVDF) were introduced to N-methyl-2-pyrrolidone (NMP) at a weight ratio of 96:2:2 and mixed to provide cathode slurry. The cathode slurry was coated onto aluminum foil as a current collector to a capacity of 3.1 mAh/cm$^2$ to provide a cathode.

3) Manufacture of Separator 3-1) Preparation of Dispersion

Al$_2$O$_3$ inorganic particles (Japan Light Metal Co., LS235, particle size 500 nm) and the first binder (cyanoethyl pullulan) were introduced to acetone as the first solvent at room temperature, followed by agitation, to prepare a dispersion. The weight ratio of the inorganic particles to the first binder polymer in the dispersion was 97.5:2.5. The combined weight of the inorganic particles and the first binder polymer was 20 parts by weight based on 100 parts by weight of the dispersion.

3-2) Preparation of Slurry for Forming Porous Coating Layer

After the inorganic particles were dispersed totally in the dispersion, a binder polymer solution was introduced thereto and milling was carried out for 20 minutes to provide slurry for forming a porous coating layer. The polymer binder solution was prepared by dissolving polyvinylidene fluoride (PVDF) as the second binder polymer into acetone as the second solvent. The second binder polymer was present in an amount of 13 parts by weight based on 100 parts by weight of the polymer binder solution.

3-3) Application and Drying of Slurry for Forming Porous Coating Layer

The slurry for forming a porous coating layer was applied to one surface of a polyethylene porous substrate by using a doctor blade, followed by drying, to obtain a separator having a porous coating layer formed thereon. The porous coating layer had a thickness of 4 μm.

4) Adhesion of Separator with Electrode

Then, the separator and the electrodes were stacked so that the separator faced the active material layers of the electrodes. After that, pressing was carried out at a temperature of 90° C. under a pressure of 8.5 MPa for 1 second to obtain an electrode assembly including the separator and the electrodes stacked successively.

Examples 2-4

Electrode assemblies were obtained in the same manner as Example 1, except that the content of the inorganic particles and that of the first binder polymer in the dispersion, and the content of the second binder polymer in the binder polymer solution were varied as shown in the following Table 1.

TABLE 1

| | Content of inorganic particles (A) | Content of the first binder polymer (B) | Combined weight of inorganic particles and the first binder polymer in the dispersion (parts by weight) (A + B) | Content of the second binder polymer in the polymer binder solution (parts by weight) (C) | (A + B)/C | Weight ratio of the first binder polymer in the dispersion to the second binder polymer in the binder polymer solution | Particle size (D50, μm) | Sedimentation rate (μm/s) | Packing density (g/cm$^3$) | Adhesion (gf/15 mm) |
|---|---|---|---|---|---|---|---|---|---|---|
| Comp. Ex. 1 | 19.5 | 0.5 | 20 | 15 | 1.3 | 1:30 | 2.5 | 0.52 | 1.46 | 45 |

TABLE 1-continued

| | Content of inorganic particles (A) | Content of the first binder polymer (B) | Combined weight of inorganic particles and the first binder polymer in the dispersion (parts by weight) (A + B) | Content of the second binder polymer in the polymer binder solution (parts by weight) (C) | (A + B)/C | Weight ratio of the first binder polymer in the dispersion to the second binder polymer in the binder polymer solution | Particle size (D50, μm) | Sedimentation rate (μm/s) | Packing density (g/cm³) | Adhesion (gf/15 mm) |
|---|---|---|---|---|---|---|---|---|---|---|
| Ex. 1 | 19.5 | 0.5 | 20 | 13 | 1.5 | 1:26 | 2.1 | 0.3 | 1.63 | 60 |
| Ex. 2 | 29.25 | 0.75 | 30 | 13 | 2.3 | 1:17.3 | 1.9 | 0.27 | 1.65 | 72 |
| Ex. 3 | 29.25 | 0.75 | 30 | 7 | 4.3 | 1:9.3 | 1.8 | 0.23 | 1.69 | 76 |
| Ex. 4 | 39 | 1 | 40 | 5 | 8.0 | 1:5 | 1.8 | 0.17 | 1.58 | 66 |
| Comp. Ex. 2 | 39 | 1 | 40 | 4.4 | 9.0 | 1:4.4 | 2.3 | 0.45 | 1.52 | 54 |
| Comp. Ex. 3 | 39 | 1 | 40 | 3 | 13.3 | 1:13.3 | 2.6 | 0.55 | 1.42 | 50 |
| Comp. Ex. 4 | — | — | — | — | — | — | 2.8 | 0.74 | 1.38 | 40 |

Comparative Examples 1-3

Electrode assemblies were obtained in the same manner as Example 1, except that the content of the inorganic particles and that of the first binder polymer in the dispersion, and the content of the second binder polymer in the binder polymer solution were varied as shown in the following Table 1.

Comparative Example 4

An electrode assembly was obtained in the same manner as Example 1, except that the inorganic particles, the first binder polymer and the second binder polymer were introduced at once during the manufacture of a separator to form slurry for forming a porous coating layer.

Particularly, the slurry for forming a porous coating layer was prepared as follows. At room temperature, Al₂O₃ as inorganic particles (Japan Light Metal Co., LS235, particle size 500 nm), cyanoethyl pullulan as the first binder polymer and polyvinylidene fluoride as the second binder polymer were mixed in acetone as a solvent at a weight ratio of 78:2:20.

Test Examples

The resultant slurry for forming a porous coating layer was determined for its particle size and sedimentation rate.

In addition, in the separator obtained by using the slurry for forming a porous coating layer, the porous coating layer was determined for the thickness of the porous coating layer, loading amount, packing density, air permeation time, adhesion with an electrode and shrinkage.

The results are shown in the following Table 1.

(1) Particle Size (D50, μm)

A particle size analyzer (PSA, available from Melburn Co.) was used to determine the particle size of slurry particles in the slurry.

(2) Sedimentation rate (μm/s)

A dispersion stability analyzer (Lumisizer LS651) was used to determine the sedimentation rate of the slurry particles in the slurry for forming a porous coating layer.

(3) Thickness of Porous Coating Layer (μm)

VL-50S (available from Mitotyoy Co.) was used to determine the thickness of the porous coating layer.

(4) Loading Amount (g/cm²)

The separator was cut into a size of 5 cm×5 cm and weighed to determine the loading amount.

(5) Packing Density (g/cm³)

The packing density was calculated according to the following Formula 1.

Packing density=Loading amount/Coating layer thickness [Formula 1]

(6) Adhesion(gf/15 mm)

After hot pressing was carried out at 90° C. under 8.5 MPa, a UTM instrument (LLOYD instruments, LF plus) was used to measure 180° peel force and evaluate the adhesion.

DESCRIPTION OF DRAWING NUMERALS

10: Inorganic particles
11: First binder polymer
12: Binder polymer solution

What is claimed is:

1. A method for manufacturing a separator, comprising the steps of:
    (S1) preparing a dispersion comprising inorganic particles (A) dispersed in a first solvent and a first binder polymer (B) dissolved in the first solvent to form slurry particles comprising the inorganic particles (A) and the first binder polymer (B) surrounding the inorganic particles (A),
    wherein the slurry particles have a particle size (D50) of 1-2.4 μm;
    (S2) preparing a binder polymer solution comprising a second binder polymer (C) dissolved in a second solvent, and mixing the binder polymer solution with the dispersion, wherein a ratio of (A+B)/C, which is the ratio of a combined weight of the inorganic particles (A) and the first binder polymer (B) in the dispersion to a weight of the second binder polymer (C) in the binder polymer solution is 1.5-8, thereby providing a slurry for forming a porous coating layer; and (S3) applying the slurry for forming the porous coating layer to at least one surface of a porous polymer substrate, followed by drying, to form a porous coating layer on the porous polymer substrate.

2. The method for manufacturing a separator according to claim 1, wherein the ratio of (A+B)/C is 2.3-4.3.

3. The method for manufacturing a separator according to claim 1, wherein each of the first binder polymer (B) and the second binder polymer (C) is any one independently selected from the group consisting of polyvinylidene fluoride-co-hexafluoropropylene, polyvinylidene fluoride-co-trichloroethylene, polymethyl methacrylate, polyethylhexyl acrylate, polybutyl acrylate, polyacrylonitrile, polyvinyl pyrrolidone, polyvinyl acetate, polyethylene-co-vinyl acetate, polyethylene oxide, polyarylate, cellulose acetate, cellulose acetate butyrate, cellulose acetate propionate, cyanoethyl pullulan, cyanoethylpolyvinyl alcohol, cyanoethyl cellulose, cyanoethyl sucrose, pullulan, carboxymethyl cellulose and combinations thereof.

4. The method for manufacturing a separator according to claim 1, wherein the first binder polymer comprises a cyano resin comprising a cyano (CN) group.

5. The method for manufacturing a separator according to claim 4, wherein the cyano resin further comprises a hydroxyl (OH) group.

6. The method for manufacturing a separator according to claim 1, wherein the first binder polymer comprises any one selected from the group consisting of acrylonitrile, cyanoethyl pullulan, cyanoethylpolyvinyl alcohol, cyanoethyl cellulose, cyanoethyl sucrose and combinations thereof.

7. The method for manufacturing a separator according to claim 1, wherein the combined weight of the inorganic particles and the first binder polymer is 20-40 parts by weight based on 100 parts by weight of the dispersion.

8. The method for manufacturing a separator according to claim 1, wherein a total content of the second binder polymer is 5-13 parts by weight based on 100 parts by weight of the binder polymer solution.

9. The method for manufacturing a separator according to claim 1, wherein the inorganic particles comprise any one selected from the group consisting of $BaTiO_3$, $Pb(Zr_xTi_{1-x})O_3$ (PZT, $0<x<1$), $Pb_{1-x}La_xZr_{1-y}Ti_yO_3$ (PLZT, $0<x<1$, $0<y<1$), $(1-x)Pb(Mg_{1/3}Nb_{2/3})O_{3-x}PbTiO_3$ (PMN-PT, $0<x<1$), hafnia ($HfO_2$), $SrTiO_3$, $SnO_2$, $CeO_2$, MgO, NiO, CaO, ZnO, $ZrO_2$, $Y_2O_3$, $Al_2O_3$, $SiO_2$, AlOOH, $TiO_2$, SiC and combinations thereof.

10. The method for manufacturing a separator according to claim 1, wherein each of the first solvent and the second solvent comprises any one independently selected from the group consisting of acetone, tetrahydrofuran, methylene chloride, chloroform, dimethylformamide, N-methyl-2-pyrrolidone (NMP), cyclohexane, water and combinations thereof.

11. The method for manufacturing a separator according to claim 1, wherein the weight ratio of the weight of the inorganic particles: combined weight of the first binder polymer and the second binder polymer is 50:50-99:1.

12. The method for manufacturing a separator according to claim 1, wherein the weight ratio of the first binder polymer content in the dispersion: the second binder polymer content in the binder polymer solution is 1:5-1:26.

13. A separator obtained by the method as defined in claim 1.

14. An electrochemical device comprising a cathode, an anode and a separator interposed between the cathode and the anode, wherein the separator is the separate as defined in claim 13.

15. The electrochemical device according to claim 14, which is a lithium secondary battery.

* * * * *